(12) United States Patent
Kuan et al.

(10) Patent No.: US 7,427,746 B2
(45) Date of Patent: Sep. 23, 2008

(54) OPTICAL MODULE HAVING OPTICAL PATH ADJUSTABLE MECHANISM

(75) Inventors: Chien-Kuo Kuan, Taipei (TW); Hsi-Yu Chen, Taipei (TW); Wei-Chen Tu, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 128 days.

(21) Appl. No.: 11/234,946

(22) Filed: Sep. 26, 2005

(65) Prior Publication Data

US 2007/0034789 A1    Feb. 15, 2007

(30) Foreign Application Priority Data

Aug. 12, 2005 (TW) ............................... 94127490 A

(51) Int. Cl.
*H01J 3/14* (2006.01)
(52) U.S. Cl. ...................................... 250/234; 250/239
(58) Field of Classification Search ................ 250/234, 250/216, 201.2, 239
See application file for complete search history.

(56) References Cited

U.S. PATENT DOCUMENTS

| | | | | |
|---|---|---|---|---|
| 4,160,598 A | * | 7/1979 | Firester et al. .............. | 356/121 |
| 4,859,847 A | * | 8/1989 | Matsuno et al. ............. | 250/239 |
| 5,640,207 A | * | 6/1997 | Rahmouni et al. .......... | 348/374 |
| 6,072,529 A | * | 6/2000 | Mutze ......................... | 348/351 |
| 6,473,205 B1 | * | 10/2002 | Pepe ........................... | 358/483 |
| 6,642,511 B1 | * | 11/2003 | Lee ............................. | 250/239 |
| 6,940,891 B2 | * | 9/2005 | Clary et al. .................. | 372/107 |
| 2003/0035020 A1 | * | 2/2003 | Menendez et al. ............ | 347/37 |

OTHER PUBLICATIONS

TheFreeDictionary.com Definition of "differential screw", available at http://www.thefreedictionary.com/Differential+screw.*

* cited by examiner

*Primary Examiner*—Stephen Yam
(74) *Attorney, Agent, or Firm*—Workman Nydegger

(57) ABSTRACT

The optical module includes a sensing member, a main body and an adjustable mechanism. The sensing member includes an optical sensor. The main body guides an external light beam into the optical sensor. The adjustable mechanism is disposed at first edges of the sensing member and the main body for combining the sensing member with the main body and adjusting the relative distance or angle between the optical sensor and the external light beam. The adjustable mechanism includes a first adjustable element and a second adjustable element. The unit adjustable amount of the adjustable mechanism is equal to a difference between a first unit displacement of the first adjustable element and a second unit displacement of the second adjustable element.

20 Claims, 4 Drawing Sheets

OPTICAL MODULE HAVING OPTICAL PATH ADJUSTABLE MECHANISM

FIELD OF THE INVENTION

The present invention relates to an optical module, and more particularly to an optical module having an optical path adjustable mechanism for adjusting the relative distance or angle between an optical sensor and an external light beam.

BACKGROUND OF THE INVENTION

Currently, the mechanisms for adjusting the optical paths of the optical sensors were mostly developed toward multi-directional adjustment. For example, the technical field associated with adjustment of the optical path of a CCD optical module comprises at least two major types of technologies.

A first mechanism for adjusting the optical path of a CCD optical module is described in Taiwanese Patent Publication No. 407826, entitled "Adjustable fixing device of a CCD plate". Such an optical path adjustable mechanism can adjust the CCD plate in five degrees of freedom, including movement in the z-axial direction (upward or downward movement), movement in the y-axial direction (leftward or rightward movement), rotation on the yz-plane (vertical rotation), rotation on the xy-plane (horizontal rotation) and movement in the x-axial direction (forward or backward movement). In this way, the external light beam is substantially perpendicular to the CCD optical sensor, thereby obtaining the desired relative distance or angle and achieving good imaging performance. This optical path adjustable mechanism described above still has some drawbacks. For example, since a complicated five-axial adjustable jig is necessary for mass production and the components thereof are plentiful, this mechanism is not suitable to use in the industry. In addition, prior to the complete adjustment, it takes a period for hardening an adhesive agent so as to fix the optical path adjustable mechanism. In other words, this optical path adjustable mechanism is not cost-effective.

In order to save cost and reduce the productive complexity, another optical path adjustable mechanism was developed. A second mechanism for adjusting the optical path of a CCD optical module is described in Taiwanese Patent No. 500279, entitled "Four-direction adjustable optical module". The optical module comprises a carriage and a CCD module. In contrast to the optical module described in Taiwanese Patent No. 407826, the carriage comprises a coupling window for connecting with the CCD module. A screw hole and a resilient element (e.g. a spring) are provided on each of bilateral sides of the coupling window. The spring protrudes from the surface of the coupling window. When the CCD module and the coupling window are assembled, a screw penetrates through the CCD module and is then screwed into the screw hole. At that time, the resilient element within or beside the screw hole will deform according to the stress from the screw. Because these two screws are separately screwed, the CCD module can be adjusted to rotate horizontally on the xy-plane. The optical module can be adjusted to move in four directions including upward or downward movement, leftward or rightward movement, vertical rotation and horizontal rotation. By adjusting the optical focus of the CCD module, the forward or backward movement is feasible.

Since the screw penetrating through the screw hole has a uniform thread pitch, the resolution to be adjusted will be limited by the uniform thread pitch. Take a M3 pitch screw for example. Since the pitch of this screw is 0.5 mm, the CCD module will advance or return in an amount of 0.5 mm for each revolution of the screw. As known, with increasing development of the CCD optical sensor, the pixel distance becomes shorter and shorter to meet the requirement of achieving higher resolution. Since this amount of pitch adjustment is too large, the short pixel distance is not obtainable. On the other hand, another type of screw having a smaller thread pitch may be utilized to obtain a more precise resolution adjustment. This specified type of screw, however, is not readily available and the cost thereof is increased.

SUMMARY OF THE INVENTION

It is an object of the present invention to provide an optical module having an optical path adjustable mechanism for precisely adjusting the relative distance or angle between an optical sensor and the external light beam in a cost-effective and convenient manner.

In accordance with a first aspect of the present invention, there is provided an optical module having an optical path adjustable mechanism. The optical module comprises a sensing member, a main body and an adjustable mechanism. The sensing member comprises an optical sensor. The main body guides an external light beam into the optical sensor. The adjustable mechanism is disposed at first edges of the sensing member and the main body for combining the sensing member with the main body and adjusting the relative distance or angle between the optical sensor and the external light beam. The adjustable mechanism comprises a first adjustable element and a second adjustable element. The unit adjustable amount of the adjustable mechanism is equal to a difference between a first unit displacement of the first adjustable element and a second unit displacement of the second adjustable element.

In an embodiment, the first adjustable element and the second adjustable element are integrally formed and synchronously driven to rotate.

In an embodiment, the adjustable mechanism comprises a first differential screw and a corresponding screw hole pedestal, and the first differential screw comprises first and second thread sections having different pitches and extending in the identical direction so as to serve as the first and second adjustable elements, respectively.

In an embodiment, the sensing member further comprises an optical sensor panel, an optical sensor fixing plate and a coupling member. The optical sensor panel comprises a plurality of screw holes, wherein the optical sensor is mounted on the optical sensor panel. The optical sensor fixing plate is used for accommodating the optical sensor therein. The coupling member is used for combining the optical sensor panel with the optical sensor fixing plate therevia.

In an embodiment, the coupling member comprises a uniform pitch screw.

In an embodiment, the adjustable mechanism further comprises a third adjustable element and a fourth adjustable element disposed at second edges of the sensing member and the main body. The unit adjustable amount of the adjustable mechanism is equal to a difference between a third unit displacement of the third adjustable element and a fourth unit displacement of the fourth adjustable element.

In an embodiment, the third adjustable element and the fourth adjustable element are integrally formed and synchronously driven to rotate.

In an embodiment, the adjustable mechanism further comprises a second differential screw and a corresponding screw hole pedestal, and the second differential screw comprises third and fourth thread sections having different pitches and extending in the identical direction so as to serve as the third and fourth adjustable elements, respectively.

In accordance with a second aspect of the present invention, there is provided an optical module having an optical path adjustable mechanism. The optical module comprises a sensing member, a main body and a first differential screw. The sensing member comprises an optical sensor. The main body guides an external light beam into the optical sensor. The first differential screw is disposed at first edges of the sensing member and the main body for combining the sensing member with the main body and adjusting the relative distance or angle between the optical sensor and the external light beam. The first differential screw comprises first and second thread sections having different pitches and extending in the identical direction. The first and second thread sections are integrally formed and synchronously driven to rotate.

In an embodiment, the optical module further comprises a screw hole pedestal corresponding to the first differential screw. The unit adjustable amount of the first differential screw is equal to a difference between the unit displacement of the first thread section and the unit displacement of the second thread section.

In an embodiment, the optical module further comprises a second differential screw disposed at second edges of the sensing member and the main body for combining the sensing member with the main body and adjusting the focusing distance or focusing angle between the optical sensor and the external light beam. The second differential screw comprises third and fourth thread sections having different pitches and extending in the identical direction. The third and fourth thread sections are integrally formed and synchronously driven to rotate.

In an embodiment, the optical module further comprises another screw hole pedestal corresponding to the second differential screw. The unit adjustable amount of the second differential screw is equal to a difference between the unit displacement of the third thread section and the unit displacement of the fourth thread section.

In accordance with a third aspect of the present invention, there is provided an optical path adjustable mechanism for use in an optical module. The optical module comprises a sensing member having an optical sensor and a main body for guiding an external light beam into the optical sensor. The optical path adjustable mechanism comprises a first adjustable element and a second adjustable element. The first adjustable element is disposed at first edges of the sensing member and the main body, and permits a first unit displacement when the first adjustable element is adjusted to move in a specified direction. The second adjustable element is disposed at the first edges of the sensing member and the main body, and permits a second unit displacement when the second adjustable element is adjusted to move in the specified direction. The first adjustable element and the second adjustable element are integrally formed and synchronously driven to rotate such that the unit adjustable amount of the optical path adjustable mechanism is equal to a difference between the first unit displacement and the second unit displacement.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
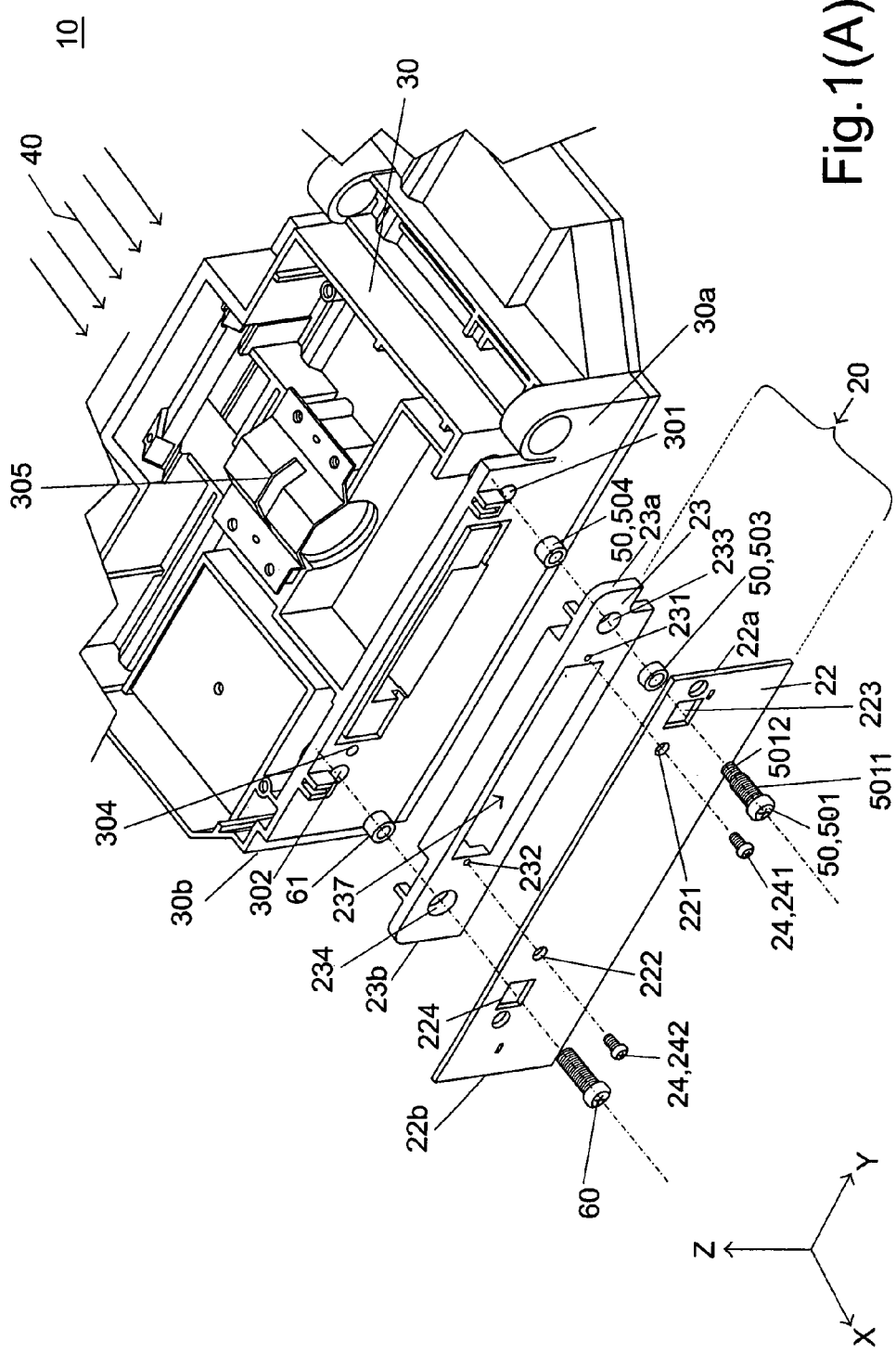
FIG. 1(A) is a front exploded view of an optical module according a first preferred embodiment of the present invention.
Figure 1B:
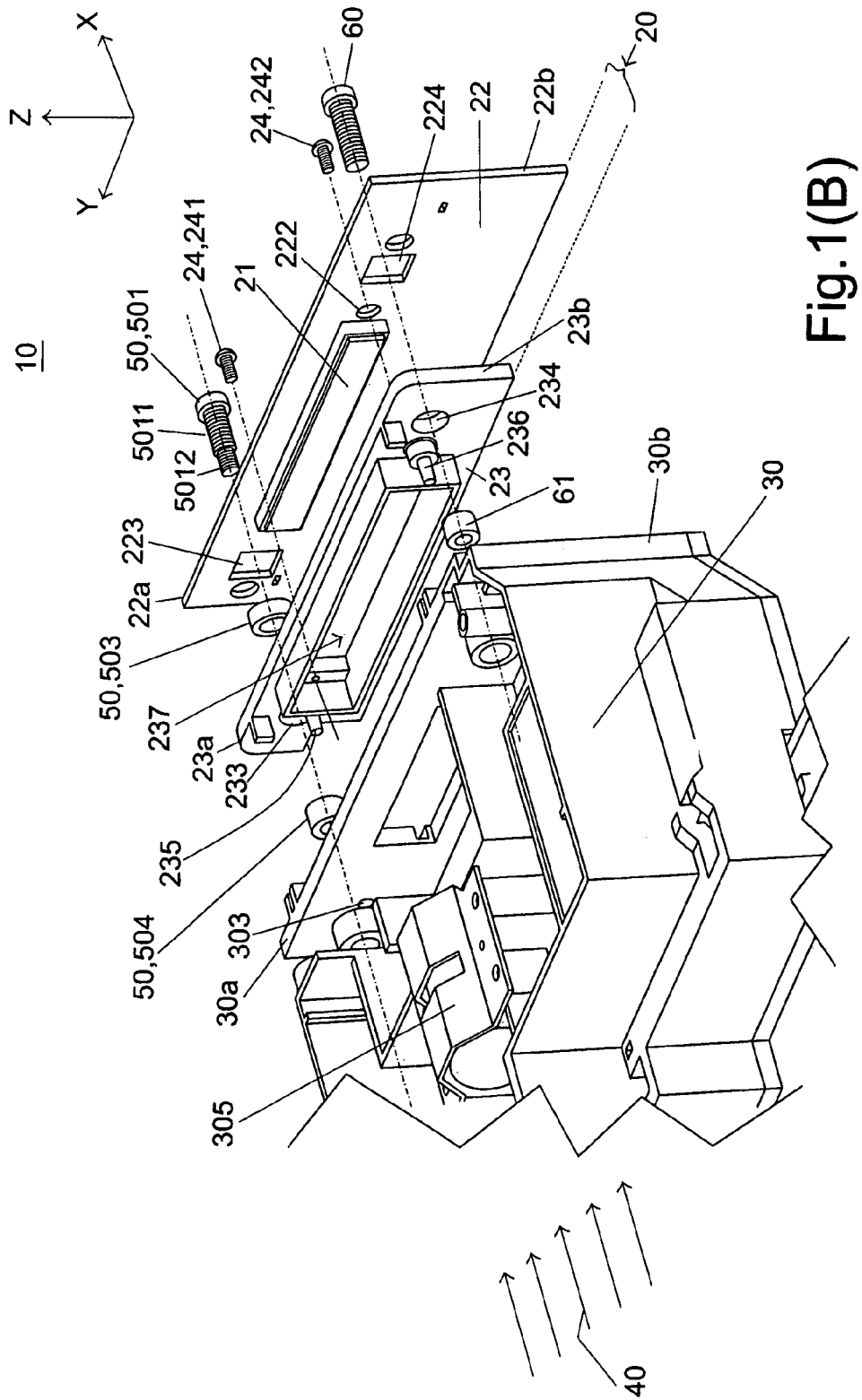
FIG. 1(B) is a rear exploded view of the optical module according the first preferred embodiment of the present invention.

Please refer to FIGS. 1(A) and 1(B), which are front and rear exploded views of an optical module according a first preferred embodiment of the present invention, respectively.

The optical module 10 of FIGS. 1(A) and 1(B) comprises a sensing member 20, a main body 30 and an adjustable mechanism 50. The main body 30 comprises two screw holes 301 and 302, two cavities 303 and 304 and a lens 305. The sensing member 20 comprises an optical sensor 21, an optical sensor panel 22, an optical sensor fixing plate 23 and a coupling member 24. The optical sensor panel 22 comprises a plurality of screw holes 221~224, and the optical sensor 21 is mounted on the optical sensor panel 22. The optical sensor fixing plate 23 comprises a plurality of screw holes 231~234, two protrusion posts 235 and 236, and an optical sensor fixing frame 237 for accommodating the optical sensor 21 therein. By means of the coupling member 24, the optical sensor panel 22 is combined with the optical sensor fixing plate 23.

In accordance with one feature of this embodiment, the adjustable mechanism 50 is disposed at the edges 22a, 23a and 30a of the optical sensor panel 22, the optical sensor fixing plate 23 and the main body 30, respectively. Whereas, for a purpose of saving cost and precisely adjusting the optical path, a uniform pitch screw 60 is employed to fix the optical sensor panel 22, the optical sensor fixing plate 23 and the main body 30 at the other edges 22b, 23b and 30b thereof.

The adjustable mechanism 50 comprises a first differential screw 501 and corresponding screw hole pedestals 503 and 504. The first differential screw 501 comprises a first thread section 5011 and a second thread section 5012, which have different pitches and extend in the identical direction, to serve as first and second adjustable elements, respectively. The first and second thread sections 5011 and 5012 penetrate through the screw hole 223, and are screwed into the screw hole pedestals 503 and 504, respectively. By the way, the screw hole pedestals 503 and 504 are arranged in the screw hole 233 of the optical sensor fixing plate 23 and the screw hole 301 of the main body 30, respectively.

For example, the pitches of the first and second thread sections 5011 and 5012 are 0.6 mm and 0.5 mm. That is to say, for each revolution of the first differential screw 501, the sensing member 20 will advance or return in an amount of a pitch difference 0.1 mm (i.e. 0.6 mm–0.5 mm=0.1 mm). Moreover, the adjustable amount will be further reduced if the screw 501 is rotated for less than one revolution, for one-tenth revolution. Consequently, the relative distance or angle between the sensing member 20 and the main body 30 will be adjusted in a trace amount in order to conform to the optical sensor 21 having a reduced pixel distance. In addition, since the external light beam 40 passing through the lens 305 is adjusted to be perpendicular to the optical sensor 21, a good imaging performance is obtainable.

The first and second thread sections 5011 and 5012 of the first differential screw 501 in this embodiment are integrally formed and synchronously rotated. It is noted that, however, those skilled in the art will readily observe that numerous modifications and alterations of the differential screw may be made while retaining the teachings of the invention. For example, the first and second thread sections 5011 and 5012 of the first differential screw 501 may be formed by assembling a first screw (not shown) having a hollow region and a second screw (not shown) in a cylindrical shape, wherein a portion of the second screw is accommodated within the hollow region of the first screw. Accordingly, the above disclosure should be limited only by the bounds of the following claims.

The uniform pitch screw 60 penetrates through the screw hole 224 and 234, and is screwed into the screw hole pedestal 61, which is arranged in the screw hole 302 of the optical sensor fixing plate 23. In such a manner, the sensing member 20 and the main body 30 are combined together. Subsequently, the screws 241 and 242 of the coupling member 24 are screwed into the screw holes 231 and 232 via the screw holes 221 and 222, respectively. Afterward, the protrusion posts 235 and 236 on the optical sensor fixing plate 23 are inserted into the cavities 303 and 304 of the main body 30, respectively. By means of the coupling member 24, the protrusion posts 235 and 236 and the cavities 303 and 304, the sensing member 20 and the main body 30 are well combined together.

Specially, the screw holes 223 and 224 of the optical sensor panel 22 are designed to have larger diameters. After the first differential screw 501 and the uniform pitch screw 60 penetrate through the screw holes 223 and 224 and the sensing member 20 and the main body 30 are combined together, the larger diameters allow for fine-tuning adjustment of the sensing member 20, including movement in the z-axial direction (upward or downward movement), movement in the y-axial direction (leftward or rightward movement) and rotation on the yz-plane (vertical rotation). On the other hand, by rotating the first differential screw 501 or the uniform pitch screw 60, the sensing member 20 will advance or return in an amount as required, thereby performing rotation on the xy-plane (horizontal rotation) and movement in the x-axial direction (forward or backward movement). Accordingly, in addition to the position adjustment in five degrees of freedom, the adjustable mechanism of the present invention is capable of adjusting the sensing member 20 in a more precise manner than prior art.

Alternatively, the adjustable mechanism 50 of the present invention may be disposed at the edges 22a, 23a and 30a of the optical sensor panel 22, the optical sensor fixing plate 23 and the main body 30, respectively, but the uniform pitch screw 60 is exempted. Under this circumstance, any engaging element is utilized to fix the optical sensor panel 22, the optical sensor fixing plate 23 and the main body 30 at the other edges 22b, 23b and 30b thereof.

Figure 2A:
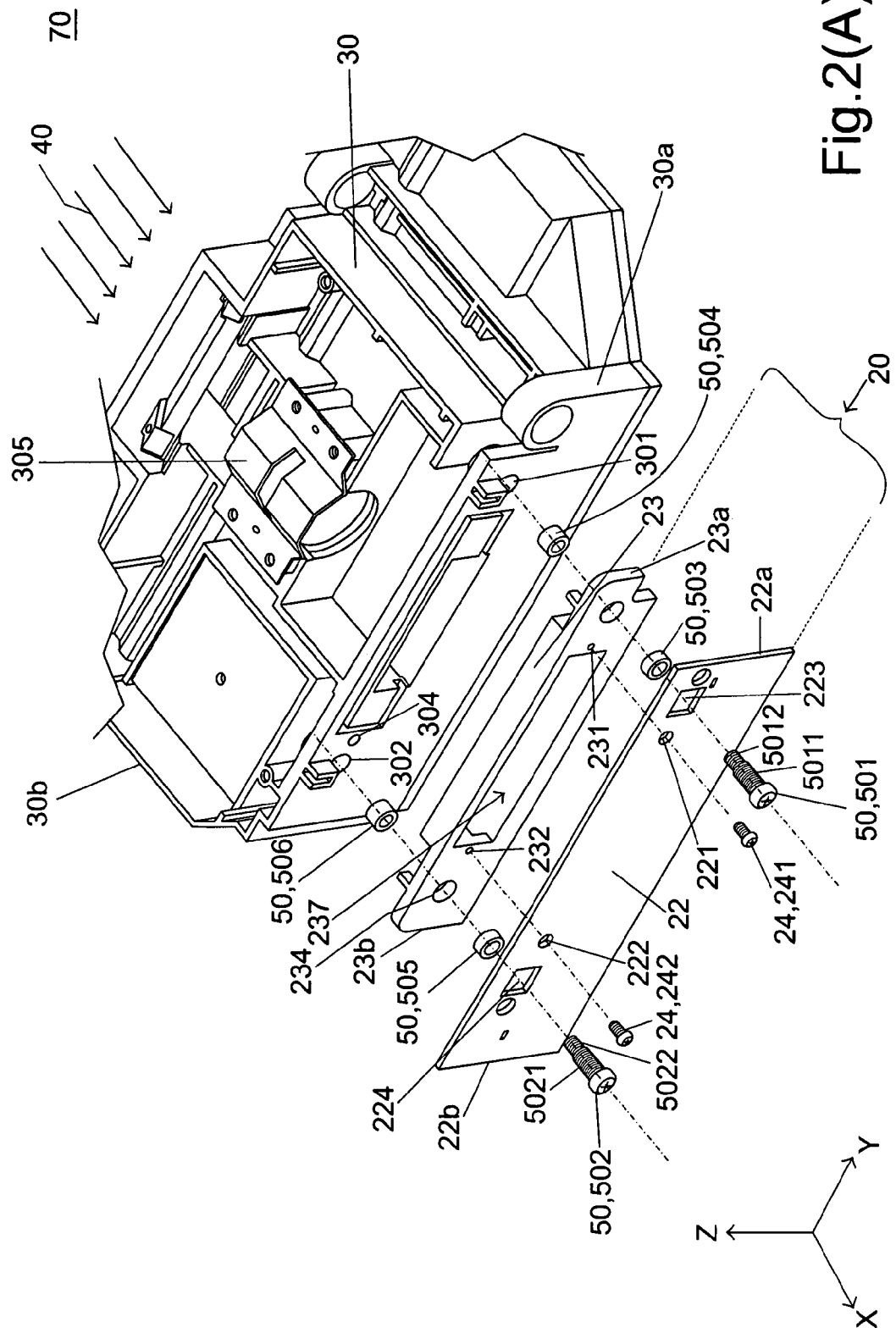
FIG. 2(A) is a front exploded view of an optical module according a second preferred embodiment of the present invention.
Figure 2B:
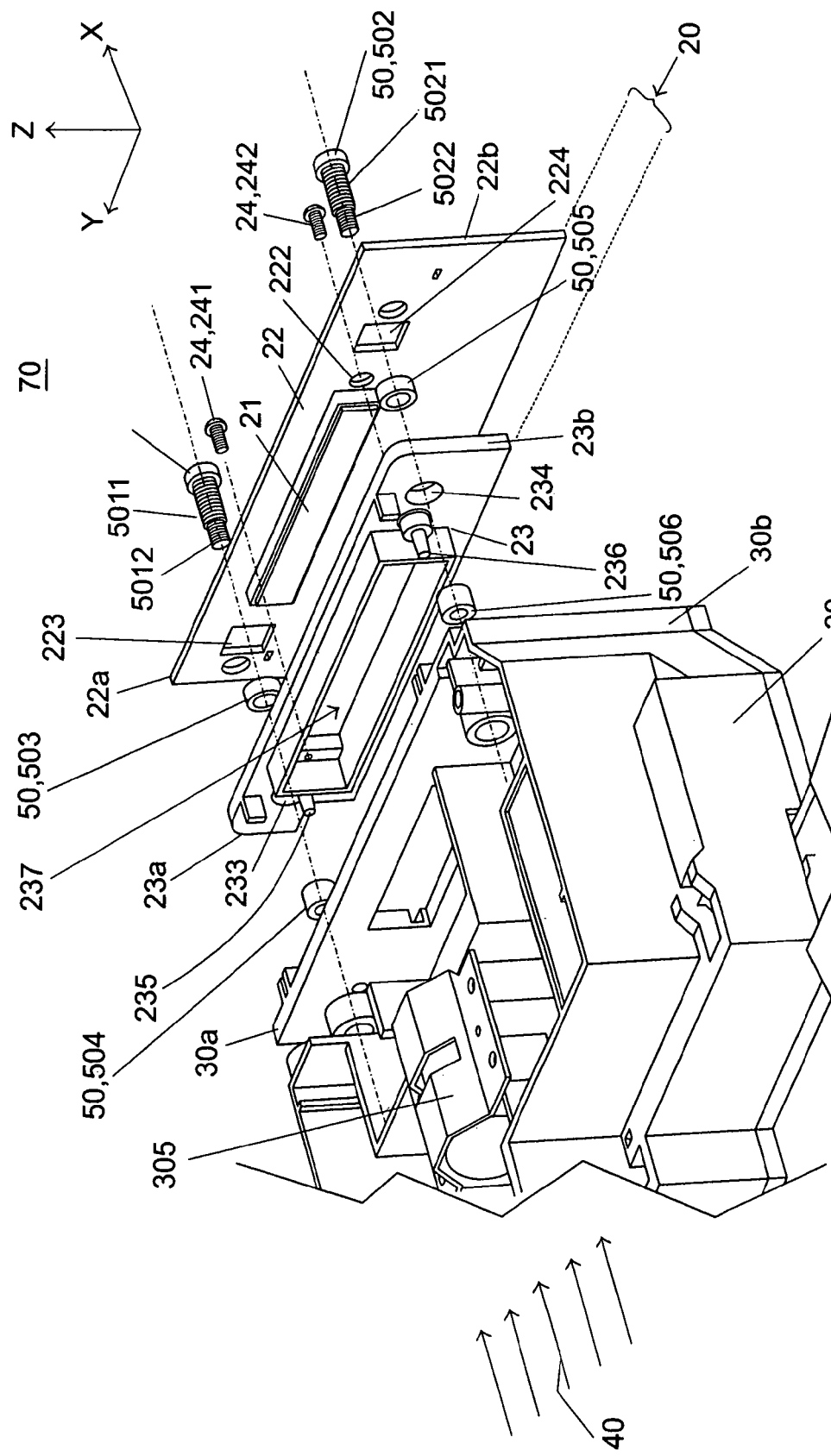
FIG. 2(B) is a rear exploded view of the optical module according the second preferred embodiment of the present invention.

Please refer to FIGS. 2(A) and 2(B), which are front and rear exploded views of an optical module according a second preferred embodiment of the present invention, respectively. The structure of the optical module 70 is similar to that of the optical module 10 of FIGS. 1(A) and 1(B), except that the uniform pitch screw 60 at the edges 22b, 23b and 30b of optical sensor panel 22, the optical sensor fixing plate 23 and the main body 30 is replaced by a second differential screw 502, which has the same structure as the first differential screw 501. Under this circumstance, the first differential screw 501 and the second differential screw 502 serve as the adjustable mechanism 50 for adjusting the relative distance or angle between the optical sensor 21 and the external light beam 40.

Likewise, the second differential screw 502 comprises third and fourth thread sections 5021 and 5022, which have different pitches and extend in the identical direction, to serve as third and fourth adjustable elements, respectively. The third and fourth thread sections 5021 and 5022 penetrate through the screw hole 224, and are screwed into the screw hole pedestals 505 and 506, respectively. By the way, the screw hole pedestals 505 and 506 are arranged in the screw holes 234 of the optical sensor fixing plate 23 and the screw hole 302 of the main body 30, respectively. The fine-tuning operation of the second differential screw 502 is similar to that of the first differential screw 501, and is not to be redundantly described herein.

Likewise, the adjustable mechanism 50 of the second embodiment allows for position adjustment including movement in the z-axial direction (upward or downward movement), movement in the y-axial direction (leftward or rightward movement) and rotation on the yz-plane (vertical rotation). On the other hand, by rotating the first differential screw 501 or the second differential screw 502, the sensing member 20 will advance or return in an amount as required, thereby performing rotation on the xy-plane (horizontal rotation) and movement in the x-axial direction (forward or backward movement). Accordingly, in addition to the position adjustment in five degrees of freedom, the adjustable mechanism of the present invention is capable of adjusting the sensing member 20 in a more precise manner than that of the first embodiment.

Moreover, since the adjustable elements are arranged on bilateral edges 22a, 23a, 30a, 22b, 23b and 30b of the optical sensor panel 22, the optical sensor fixing plate 23 and the main body 30, the magnification error or the total optical path difference will be minimized.

From the above description, the adjustable mechanism of the optical module according to the present invention is capable of adjusting the relative distance or angle between the optical sensor and the external light beam in a cost-effective, convenient and fine-tuning manner.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical module having an optical path adjustable mechanism, said optical module comprising:
    an optical sensor;
    a main body capable of guiding an external light beam into said optical sensor; and
    an adjustable mechanism capable of attaching to said main body and capable of adjusting the relative distance or angle between said optical sensor and said external light beam, wherein said adjustable mechanism comprises a first adjustable element and a second adjustable element that are collectively implemented as a differential screw, and the unit adjustable amount of said adjustable mechanism is equal to a difference between a first unit displacement of said first adjustable element and a second unit displacement of said second adjustable element.

2. The optical module according to claim 1 wherein said first adjustable element and said second adjustable element are integrally formed and synchronously driven to rotate.

3. The optical module according to claim 1 wherein said differential screw comprises first and second thread sections having different pitches and extending in the identical direction so as to serve as said first and second adjustable elements, respectively.

4. The optical module according to claim 1 wherein said optical module further comprises:
an optical sensor panel attachable to said main body by said adjustable mechanism, comprising a plurality of holes, wherein said optical sensor is mounted on said optical sensor panel;
an optical sensor fixing plate capable of accommodating said optical sensor therein;
and a coupling member capable of combining said optical sensor panel with said optical sensor fixing plate.

5. The optical module according to claim 4 wherein said coupling member comprises a uniform pitch screw.

6. The optical module according to claim 1 wherein said adjustable mechanism further comprises a third adjustable element and a fourth adjustable element collectively implemented as a second differential screw, wherein the unit adjustable amount of said adjustable mechanism is equal to a difference between a third unit displacement of said third adjustable element and a fourth unit displacement of said fourth adjustable element.

7. The optical module according to claim 6 wherein said third adjustable element and said fourth adjustable element are integrally formed and synchronously driven to rotate.

8. The optical module according to claim 6 wherein said second differential screw comprises third and fourth thread sections having different pitches and extending in the identical direction so as to serve as said third and fourth adjustable elements, respectively.

9. The optical module according to claim 1, wherein the main body comprises a lens.

10. An optical module having an optical path adjustable mechanism, said optical module comprising:
a sensing member comprising an optical sensor;
a main body comprising an optical element capable of guiding an external light beam into said optical sensor;
a first differential screw disposed at first edges of said sensing member and said main body and capable of coupling said sensing member with said main body and adjusting the relative distance or angle between said optical sensor and said external light beam, wherein said first differential screw comprises first and second thread sections having different pitches and extending in generally the same direction; and
a second differential screw disposed at second edges of said sensing member and said main body capable of combining said sensing member with said main body and adjusting the focusing distance or focusing angle between said optical sensor and said external light beam, wherein said second differential screw comprises third and fourth thread sections having different pitches and extending in the identical direction, and said third and fourth thread sections are integrally formed and synchronously driven to rotate.

11. The optical module according to claim 10 further comprising a screw hole pedestal corresponding to said first differential screw, wherein the unit adjustable amount of said first differential screw is equal to a difference between the unit displacement of said first thread section and the unit displacement of said second thread section.

12. The optical module according to claim 10 further comprising another screw hole pedestal corresponding to said second differential screw, wherein the unit adjustable amount of said second differential screw is equal to a difference between the unit displacement of said third thread section and the unit displacement of said fourth thread section.

13. The optical module according to claim 10, wherein the optical element comprises a lens.

14. An optical path adjustable mechanism comprising:
a first adjustable element disposed at first edges of a sensing member and a main body, and permitting a first unit displacement when said first adjustable element is adjusted to move in a specified direction;
a second adjustable element disposed at said first edges of said sensing member and said main body, and permitting a second unit displacement when said second adjustable element is adjusted to move in said specified direction, wherein said first adjustable element and said second adjustable element are collectively implemented as a differential screw configured such that the unit adjustable amount of said optical path adjustable mechanism is equal to a difference between said first unit displacement and said second unit displacement; and
a uniform pitch screw at second edges of said sensing member and said main body, and permitting a unit displacement when said uniform pitch screw is adjusted to move in a specified direction.

15. An optical path adjustable mechanism according to claim 14 wherein said first and second adjustable element are adjusted to move in said specified direction including at least a horizontal rotation and a forward/backward movement.

16. The optical path adjustable mechanism according to claim 14, wherein the main body comprises a lens.

17. An apparatus, comprising:
a main body in which a lens is held, the main body defining an opening that is in optical communication with the lens;
a sensing member comprising:
an optical sensor attached to an optical sensor panel without the use of any intervening structures between the optical sensor and the optical sensor panel,
wherein the optical sensor panel comprises a first hole and a second hole; and
an optical sensor fixing plate interposed between the optical sensor panel and the main body, the optical sensor fixing plate defining an optical sensor fixing frame within which the optical sensor is partially received;
a first differential coupler disposed through the first hole and capable of fastening the sensing member to the main body;
a second coupler disposed through the second hole and capable of fastening the sensing member to the main body;
wherein the first differential coupler and/or the second coupler are capable of adjusting the position of the optical sensor with respect to the main body in at least one of a rotation on a xy-plane or a x-axial direction; and
wherein the first hole and/or the second hole are capable of adjusting the position of the optical sensor respect to the main body in at least one of a z-axial direction, a y-axial direction, or a rotation on the yz-plane.

18. The apparatus of claim 17, wherein said second coupler comprises a second differential coupler.

19. The apparatus of claim 17, wherein the main body is capable of guiding an external light beam into said optical sensor.

20. The apparatus of claim 19, wherein the main body comprises a lens.

* * * * *